Jan. 20, 1942.   S. E. THORNTON   2,270,776
SAW
Filed June 3, 1940

Samuel E. Thornton
INVENTOR.

BY Glenn L. Fish
ATTORNEY

Patented Jan. 20, 1942

2,270,776

UNITED STATES PATENT OFFICE 2,270,776

SAW

Samuel E. Thornton, Coeur d'Alene, Idaho

Application June 3, 1940, Serial No. 338,637

1 Claim. (Cl. 143—133)

This invention relates to a saw and more particularly to a rip saw, it being one object of the invention to provide a saw having its teeth so formed that when the saw is used to rip a board, the surfaces of the board at opposite sides of the kerf will be smooth, thus making it unnecessary to pass the board through a planer to form a smooth side edge face for the board.

Another object of the invention is to so form the teeth of the saw that they will be sharpened along their side edges and not only cut a board with a smooth side edge face but also cause the board to be easily and quickly cut.

Another object of the invention is to provide the saw with teeth having diagonally extending front faces which serve to direct shavings and saw dust laterally of the saw from sides thereof and thus prevent the saw from becoming clogged during a sawing operation.

The invention is illustrated in the accompanying drawing, wherein.

The saw 1 has been illustrated as a circular saw, but it is to be understood that it may be a hand saw, or any other well known type of saw.

Figure 1:
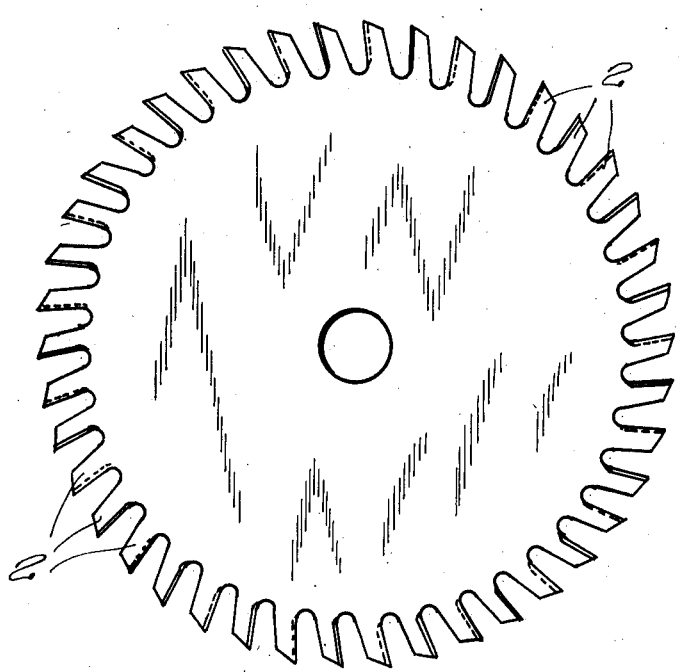
Figure 1 is a side elevation of the improved saw.
Figure 2:
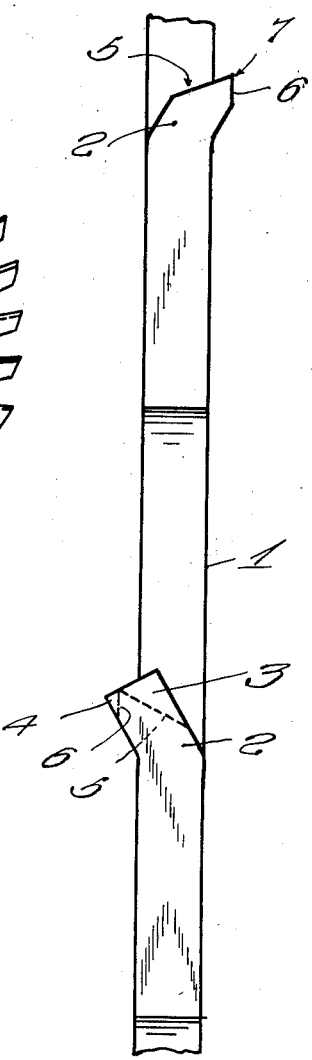
Figure 2 is a fragmentary view on an enlarged scale, looking at the edge of the saw and showing steps followed when forming the teeth.
Figure 3:
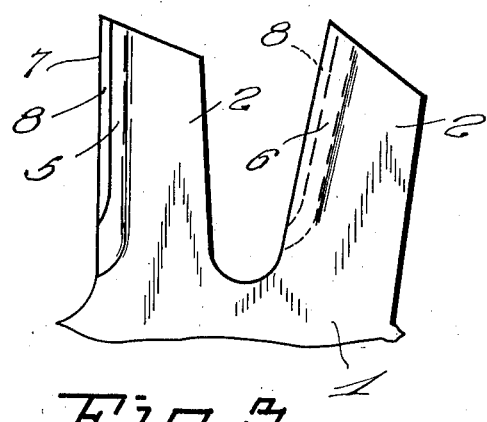
Figure 3 is a fragmentary view on an enlarged scale showing two of the saw teeth in side elevation.

This saw is formed with a plurality of teeth 2 which are preferably integral with the saw but not necessarily so, as they may be formed separate from the saw body and suitably applied thereto if so desired. The teeth extend from the marginal edge of the saw blade and each tooth is set transversely to extend diagonally of the saw blade, as shown in Figure 2 of the drawing, for the full length of the tooth. A tooth so set extends forwardly diagonally of the periphery of the saw blade with its forward portion projecting from a side face of the saw blade, and it will be noted from an inspection of Figure 2, that alternate teeth project from opposite sides of the saw blade. After the teeth have been set, their inner and outer faces have portions 3 and 4 ground off to form a front face 5 and a side face 6. The face 5 extends diagonally across the periphery of the saw blade and the outer side face 6 extends parallel to the adjacent side face of the saw blade and along its front edge intersects the outer side edge of the face 5. The saw is then placed on a jointer and the face 5 pointed along the edge 7 for practically the full depth of the tooth, as shown at 8 in Figure 3. This causes the tooth to be very sharp along its edge 7 as well as across the outer end of its face 5 and, when the saw is in use, the sharp edges 7 of the teeth will having a planing or slicing action as the saw cuts its way through a board and smooth edge faces will be formed along the board at opposite sides of the kerf. As the board is cut, shavings and saw dust will make contact with the front faces 5 of the saw teeth and be deflected laterally so that they are discharged from sides of the saw and prevented from clogging the teeth of the saw.

Having thus described the invention, what is claimed is:

A saw comprising a blade having teeth along a marginal edge thereof, said teeth having forward portions only bent transversely to project alternate teeth diagonally from opposite side faces of the blade, and the front portion of each tooth having inner and outer side faces and a front face extending diagonally of the tooth from its inner side face toward its outer side, the outer side face having its front edge portion beveled and extending parallel to the adjacent side face of the blade and intersecting the outer side edge of the front face to provide a cutting edge sharpened for substantially the full depth of the tooth.

SAMUEL E. THORNTON.